(12) United States Patent
Rust et al.

(10) Patent No.: US 12,448,698 B2
(45) Date of Patent: Oct. 21, 2025

(54) METHOD FOR PRODUCING A STRUCTURAL MATERIAL STACK

(71) Applicants: THE BOEING COMPANY, Arlington, VA (US); Radius Aerospace, Inc., Sheffield (GB)

(72) Inventors: Charles William Rust, Seattle, WA (US); John Alfred Weidler, III, Lynnwood, WA (US); Muhammad Jawad Qarni, Newcastle Upon Tyne (GB); Niall Mannion, Newcastle Upon Tyne (GB)

(73) Assignee: The Boeing Company, Alexandria, VA (US)

( * ) Notice: Subject to any disclaimer, the term of this patent is extended or adjusted under 35 U.S.C. 154(b) by 280 days.

(21) Appl. No.: 18/183,541

(22) Filed: Mar. 14, 2023

(65) Prior Publication Data
US 2024/0018682 A1    Jan. 18, 2024

Related U.S. Application Data

(60) Provisional application No. 63/368,585, filed on Jul. 15, 2022.

(51) Int. Cl.
*C25D 5/56* (2006.01)
*B23K 26/386* (2014.01)
(Continued)

(52) U.S. Cl.
CPC .............. *C25D 5/56* (2013.01); *B23K 26/386* (2013.01); *B23K 26/402* (2013.01); *B64F 5/10* (2017.01);
(Continued)

(58) Field of Classification Search
CPC ................ B23K 26/386; B23K 26/402; B64C 2001/0072; B64C 2001/0081; B64D 2033/0206; B64D 2033/0233; B64D 29/00; B64D 29/08; B64D 33/02; B64F 5/10; C25D 3/12; C25D 3/562; C25D 5/54; C25D 5/56; C25D 7/04
See application file for complete search history.

(56) References Cited

U.S. PATENT DOCUMENTS

| | | |
|---|---|---|
| 2010/0304171 A1 | 12/2010 | Tomantschger et al. |
| 2016/0160681 A1 | 6/2016 | Roach et al. |
| 2017/0190856 A1 | 7/2017 | Lonjon et al. |

FOREIGN PATENT DOCUMENTS

| | | |
|---|---|---|
| CN | 112126957 A | 12/2020 |
| CN | 113645825 A | 11/2021 |

OTHER PUBLICATIONS

Extended European Search Report received for related EP App. No. 23180848 dated Nov. 17, 2023 (9 pages).

*Primary Examiner* — Lawrence D Ferguson
(74) *Attorney, Agent, or Firm* — Joseph M. Butscher; The Small Patent Law Group LLC

(57) ABSTRACT

A method for producing a structural material stack includes forming a composite panel that includes a carbon fiber reinforced polymer (CFRP) material, and applying an interface film on an exterior composite surface of the composite panel. The interface film is electrically conductive. The method includes performing an electroplating process to form a metallic coating on the interface film such that the interface film is sandwiched between the composite panel and the metallic coating. The metallic coating has a different material composition than the interface film.

20 Claims, 10 Drawing Sheets

(51) Int. Cl.
  *B23K 26/402* (2014.01)
  *B64F 5/10* (2017.01)
  *C25D 3/56* (2006.01)
  *C25D 7/04* (2006.01)
  *B64D 29/08* (2006.01)
(52) U.S. Cl.
  CPC .............. *C25D 3/562* (2013.01); *C25D 7/04* (2013.01); *B64D 29/08* (2013.01)

METHOD FOR PRODUCING A STRUCTURAL MATERIAL STACK

CROSS-REFERENCE TO RELATED APPLICATIONS

This application is a non-provisional conversion of, and claims priority to, U.S. Patent Application No. 63/368,585, filed Jul. 15, 2022, which is hereby incorporated by reference in its entirety.

FIELD OF THE DISCLOSURE

Embodiments of the present disclosure generally relate to a structural material stack that can be used to construct an aircraft, such as a lipskin of a nacelle inlet.

BACKGROUND

Some types of aircraft include propulsion systems attached to the wings, fuselage, or tail of the aircraft. The propulsion systems have nacelles which are outer casings for the propulsion equipment (e.g., engine). A nacelle includes an inlet section at a leading or front end of the nacelle. The nacelle may also include a fan cowl, a thrust reverser section, and an aft fairing section located behind the inlet section along a longitudinal length of the nacelle. The inlet section has an inner barrel that defines an air inlet duct for directing air to a fan and downstream propulsion equipment. The inner barrel may have an acoustic panel to facilitate noise reduction.

There are several advantages with using a carbon fiber reinforced polymer (CFRP) material to form structural material stacks for constructing an aircraft. For example, CFRP material has a relatively high strength to weight ratio. However, incorporating CFRP material into surface components that define exterior surfaces of the aircraft, such as the lipskin of a nacelle inlet, has several difficulties. The CFRP material may degrade and erode when exposed to environmental elements, such as wind, moisture, sunlight, debris, birds, and the like. Furthermore, surface roughness of the CFRP material may negatively affect aerodynamic performance of the aircraft by creating drag and turbulent air flow.

SUMMARY OF THE DISCLOSURE

A need exists for a structural material stack that can be used on an aircraft, where the material stack includes a CFRP composite panel and a metallic coating that shields the CFRP panel from the elements. A need also exists for producing (e.g., forming) the structural material stack such that the metallic coating is reliably, accurately, and permanently bonded to the CFRP composite panel.

Certain embodiments of the present disclosure provide a method for producing a structural material stack. The method includes forming a composite panel that includes a carbon fiber reinforced polymer (CFRP) material. The composite panel includes an exterior composite surface. The method includes applying an interface film on the exterior composite surface of the composite panel. The interface film is electrically conductive and has an interior interface surface and an exterior interface surface. The method includes performing an electroplating process to form a metallic coating on the exterior interface surface of the interface film such that the interface film is sandwiched between the composite panel and the metallic coating. The metallic coating has a different material composition than the interface film, thereby forming said structural material stack.

Certain embodiments of the present disclosure provide a structural material stack that includes a composite panel, an interface film, and a metallic coating. The composite panel includes a carbon fiber reinforced polymer (CFRP) material. The composite panel includes an exterior composite surface. The interface film is bonded via an adhesive to the exterior composite surface of the composite panel. The interface film is electrically conductive and has an interior interface surface and an exterior interface surface. The metallic coating is formed on the exterior interface surface of the interface film such that the interface film is sandwiched between the composite panel and the metallic coating. The metallic coating has a different material composition than the interface film.

Certain embodiments of the present disclosure provide a method for producing an inlet cowl. The method includes forming a composite panel that includes a carbon fiber reinforced polymer (CFRP) material. The composite panel includes an exterior composite surface and is formed to have a curved contour that represents at least a portion of an annular barrel shape. The method includes applying an interface film on the exterior composite surface of the composite panel. The interface film includes over 50% by weight of a metallic particulate. The method includes performing an electroplating process to form a metallic coating on the interface film such that the interface film is sandwiched between the composite panel and the metallic coating. The metallic coating has a nickel alloy composition which is different from a material composition of the interface film. The metallic coating defines an exterior surface of the inlet cowl along a leading edge of the inlet cowl.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
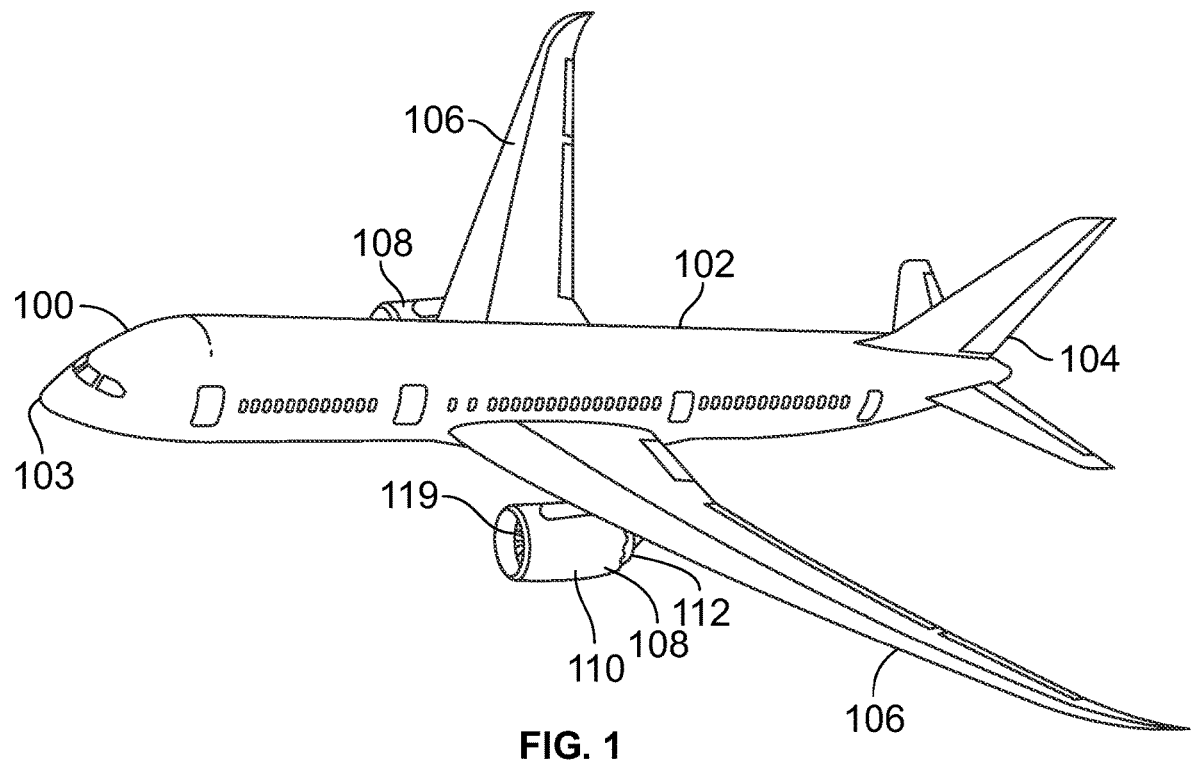
FIG. 1 is a perspective illustration of an aircraft.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

This invention was made with UK Government support under 22482—UK Aerospace Research and Technology Programme. The UK Government may have certain rights in this invention.

Certain embodiments of the present disclosure provide a structural material stack for an aircraft, and a method of producing the structural material stack. The structural material stack includes at least a CFRP composite panel and a metallic coating that shields the CFRP composite panel from the elements. In at least one embodiment, the structural material stack is formed to define a lipskin of an inlet assembly of a nacelle. Descriptions herein refer to the structural material stack being used as the lipskin of an inlet assembly of a nacelle, although the structural material stack is not limited to the nacelle inlet. Various other applications of the structural material stack are contemplated. For example, the structural material stack may represent a skin along the wings, fuselage, fan blades, and/or the like.

The method of producing the structural material stack includes electroforming (e.g., electroplating) a metallic coating onto a CFRP composite panel. Electroforming is a proven additive manufacturing technique used to produce metal parts by electro-chemical deposition of metal over a mandrel. The electroforming process is referred to herein as electroplating. However, it is difficult to reliably, accurately, and permanently plate metal layers on CFRP composite materials. Known, previous attempts at this process have yielded low bond strength between the metallic material and CFRP material. The leading candidate for CFRP protection is bonding constituent materials together after fabrication, but a large field area can exhibit voids in the bond interface. One known attempt involves bonding titanium foil onto a CFRP material. The titanium foil does not conform well to the surface contour on which the foil is bonded, and may require multiple costly surface treatments to assure life of the adhesion during use on an aircraft. In addition, when used as a lipskin, the surface quality of the bonded titanium foil may be insufficient to achieve desired aerodynamic properties of the lipskin, such as to extended achieve laminar flow along the exterior surface of the lipskin.

In one or more embodiments, the method described herein involves applying a metallically-doped interface film on an exterior composite surface of the CFRP composite panel, and electroplating a metallic coating on the interface film such that the interface film is sandwiched between the CFRP composite panel and the metallic coating. The interface film may enable successful plating of the metallic coating onto the CFRP composite panel. For example, the interface film may have an electrically uniform surface along the area of the interface film to assure relatively even plating thickness and/or surface quality of the metallic coating formed during the subsequent electroplating process. The plating process described herein may beneficially achieve good bond strength to reliably and permanently retain the metallic coating to the CFRP panel over time and after aging of the materials. The plating process may produce structural material stacks that have relatively smooth and uniform exterior surfaces, to promote laminar flow and aerodynamic performance when utilized as a lipskin.

The inlet assembly described herein may be designed to enhance laminar fluid flow along an exterior surface of the inlet cowl. Enhancing laminar flow along the outer side of the inlet cowl may result in improved aerodynamic performance, such as greater fuel efficiency, relative to conventional inlet cowls. The laminar fluid flow may be enhanced by extending a longitudinal length of a laminar flow region along the exterior surface of the inlet cowl. The laminar flow region may be elongated by designing the outer side of the inlet cowl to have a contour that promotes laminar fluid flow and is seamless along the exterior surface. For example, an outer side of the inlet cowl may be seamless from a leading edge of the inlet cowl to an outer aft edge of the outer side. The exterior surface of the outer side may be relatively smooth and uniform along the length, providing a surface quality that promotes laminar flow. The exterior surface may be defined by a metallic coating of a lipskin of the inlet cowl. The metallic coating may define the leading edge and the entire length of the exterior surface of the outer side from the leading edge to the outer aft edge. The inlet assembly described herein may have a continuous material system in which the metallic coating of the lipskin seamlessly extends along the leading edge of the inlet cowl and the entire length of the outer side of the inlet cowl. Conventional inlet cowls may include seams at interfaces between the lipskin and the outer barrel panel. The seams cause turbulent fluid flow along the exterior surface, which is detrimental to flight and engine performance.

In an embodiment, the laminar flow region may be elongated by extending the length of the outer side of the inlet cowl. For example, the inlet cowl may include an extended section that longitudinally projects, in an aft direction, beyond an inner aft edge of an inner side of the inlet cowl. The extended section may be located aft of a fan cowl interface and/or A flange. The laminar flow region may extend along at least a portion of the extended section, promoting laminar flow along the inlet cowl beyond the traditional fan cowl split line. The extended section may be structurally supported by a rigid and strong carbon fiber reinforced polymer (CFRP) material of a composite panel of the lipskin, along which the metallic coating is disposed. Optionally, the extended section may be structurally supported by support frames that extend from the inner side of the inlet cowl to the extended section of the outer side. The support frames and/or CFRP material provide rigidity to maintain the designed contour of the outer side of the inlet cowl to extend the laminar flow region onto the extended section.

The inlet assembly described herein may be incorporated with a fluid ice protection system (FIPS) that is designed to prohibit ice formation on and/or remove accumulated ice from the leading edge section of the inlet cowl. The inlet assembly with the perforated leading edge of the inlet cowl, as described herein, is designed to be incorporated with a hydraulic (liquid) FIPS. The FIPS may supply an anti-ice liquid into the inlet cowl, for the liquid to weep through the perforations onto the exterior surface of the lipskin, defined by the metallic coating. The liquid prevents the formation of ice (and removes any ice already present) along the inlet, which can be detrimental to flight and engine performance. The FIPS may include a plenum back wall that is coupled to the interior surface of the lipskin to define a plenum (e.g., cavity). The anti-ice liquid is supplied to the plenum through one or more conduits that extend from a reservoir remote from the inlet cowl. The FIPS may include one or more membranes within the plenum that absorb and distribute the anti-ice liquid to the perforations. For example, the membrane(s) may extend across and cover all or a majority of the perforations, such that the anti-ice fluid enters the perforations from the membrane(s).

Referring now to the drawings, which illustrate various embodiments of the present disclosure, FIG. 1 is a perspective illustration of an aircraft 100. The aircraft 100 may include a fuselage 102 extending from a nose 103 to an empennage 104. The empennage 104 may include one or more tail surfaces for directional control of the aircraft 100. The aircraft 100 includes a pair of wings 106 extending from the fuselage 102. One or more propulsion systems 108 propel the aircraft 100. The propulsion systems 108 are supported by the wings 106 of the aircraft 100, but may be mounted to the fuselage or tail in other types of aircraft. Each propulsion system 108 includes a rotor assembly 119 with rotors that spin to direct air.

The rotor assembly 119 of each propulsion system 108 is surrounded by a nacelle 110. The nacelle 110 is an outer casing or housing that holds the rotor assembly 119. The nacelle 110 includes an inlet section, referred to as an inlet cowl, at a leading or front end of the nacelle 110. The nacelle 110 may also include a fan cowl, a thrust reverser section, and an aft fairing section located behind the inlet cowl along a longitudinal length of the nacelle 110. The inlet cowl has an inner barrel that defines an air inlet duct for directing air to the rotor assembly 119. The inner barrel may have an acoustic panel to facilitate reducing noise created by the rotor assembly 119. The nacelle 110 may have an exhaust nozzle 112 (e.g., a primary exhaust nozzle and a fan nozzle) at an aft end of the propulsion system 108.

In an embodiment, each propulsion system 108 may include or represent a gas turbine engine. The rotor assembly 119 may be a portion of the engine. The engine burns a fuel, such as gasoline, kerosene, biofuel, or other fuel source, to generate thrust for propelling the aircraft 100.

In an alternative embodiment, the rotor assemblies 119 of some of all of the propulsion systems 108 may be driven by electrically-powered motors, rather than by the combustion of fuel within a gas turbine engine. For example, the motors of such propulsion systems 108 may be electrically-powered by an onboard electrical energy storage device (e.g., a battery system) and/or an onboard electrical energy generation system.

Figure 11:
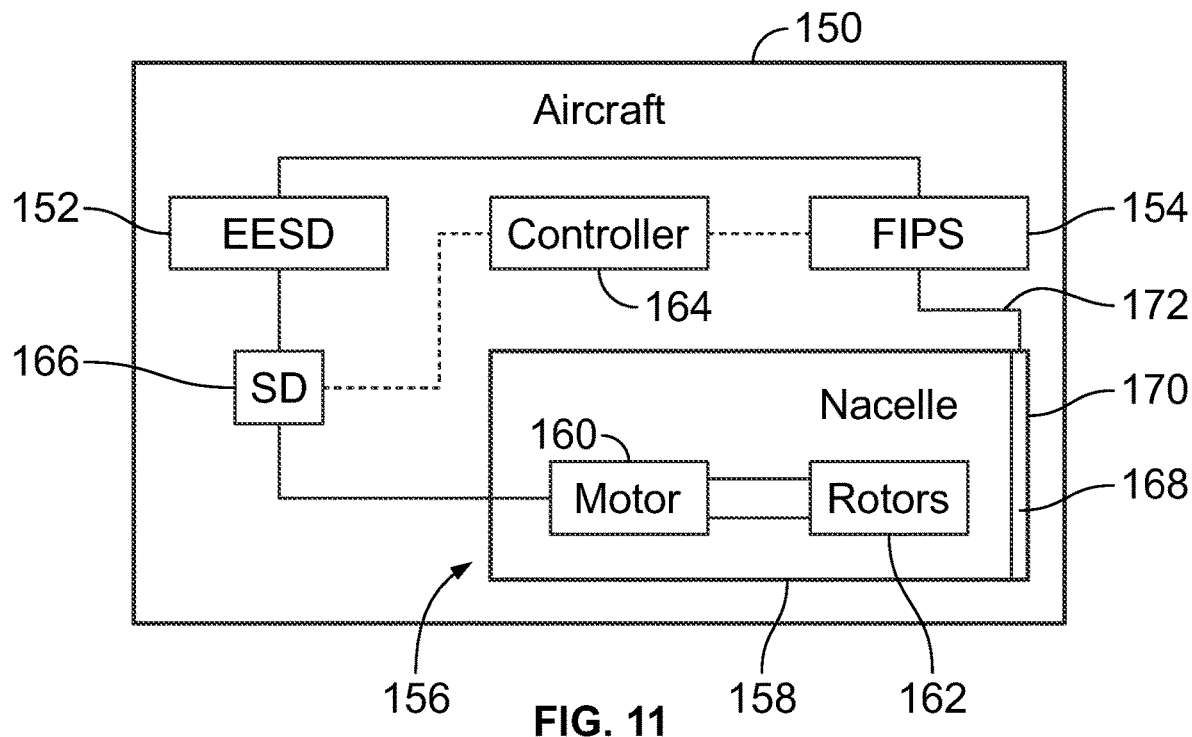
FIG. 11 is a block diagram of a second aircraft according to an embodiment.

FIG. 11 is a block diagram of a second aircraft 150 according to an embodiment. The aircraft 150 in FIG. 11 may be an all-electric aircraft that lacks any fuel combustion engine, or a hybrid aircraft that includes at least one fuel combustion engine. The aircraft 150 includes an electrical energy storage device (EESD) 152, a fluid ice protection system (FIPS) 154, and a propulsion system 156. The propulsion system 156 includes a nacelle 158 that surrounds a motor 160 and a rotor assembly 162 ("rotors" in FIG. 11). The motor 160 is powered by electric current supplied from the EESD 152. The EESD 152 may be a battery system that includes at least one battery cell. Optionally, the EESD 152 may include one or more capacitors or other charge-storing devices. The EESD 152 may be rechargeable.

The aircraft 150 includes a controller 164 that has one or more processors. The controller 164 may control the delivery of electric current to the motor 160 via one or more switch devices (SD) 166 along a power delivery circuit path between the EESD 152 and the motor 160. The motor converts electrical energy to mechanical energy that exerts a torque on the rotor assembly 162 to spin the rotors. The aircraft 150 may be an unmanned aerial vehicle (e.g., a drone), a passenger aircraft, or the like.

The FIPS 154 supplies an anti-ice liquid to an inlet cowl 168 of the nacelle 158 to prohibit the formation of ice along a leading edge 170 of the nacelle 158. The anti-ice liquid is conveyed through one or more conduits 172 that form a fluid delivery network. The FIPS 154 may be powered by electric current supplied from the EESD 152 or another onboard electrical energy storage device. The operation of the FIPS 154 may be controlled by the controller 164, or another controller. All of the components shown in FIG. 11 may be disposed onboard the aircraft 150. The aircraft 150 may include more than one of the illustrated components, such as multiple propulsion systems 156.

Figure 2:
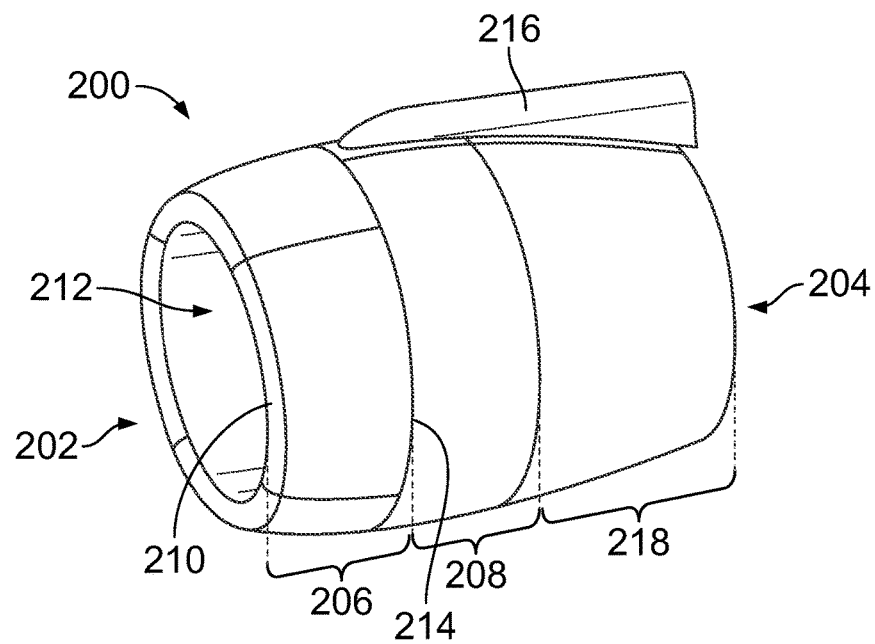
FIG. 2 illustrates an embodiment of a nacelle of a propulsion system of an aircraft according to an embodiment.

FIG. 2 illustrates an embodiment of a nacelle 200 of a propulsion system of an aircraft according to an embodiment. The nacelle 200 may be one of the nacelles 110 of the propulsion systems 108 shown in FIG. 1 and/or the nacelle 158 of the propulsion system 156 shown in FIG. 11. The nacelle 200 extends a length from a front end 202 of the nacelle 200 to an aft end 204 of the nacelle 200 (opposite the front end 202). The nacelle 200 may include an inlet cowl 206 and a fan cowl 208. The inlet cowl 206 defines a leading edge 210 of the nacelle 200 at the front end 202, to direct air into a core 212 of the nacelle 200. The fan cowl 208 is aft of the inlet cowl 206 and is connected to the inlet cowl 206. The fan cowl 208 may connect to and extend from an outer aft edge 214 of the inlet cowl 206. The fan cowl 208 may surround the rotor assembly, such as one or more fans mounted at a forward end of an engine within the core 212.

The nacelle 200 may include a mount 216 for securing the nacelle 200 and the rotary components held by the nacelle 200 to the aircraft. The mount 216 may be a pylon. The nacelle 200 includes at least one aft section 218 that is disposed aft of the fan cowl 208 along the length of the nacelle 200. When the nacelle 200 holds a gas turbine engine, the aft section(s) 218 may surround engine components such as a compressor, combustion chamber (or combustor), and turbine. The aft section(s) 218 may include or represent a thrust reverser, aft fairing, or the like. The aft section(s) 218 may define the aft end 204 and an aft nozzle through which air and exhaust products are emitted from the propulsion system.

Figure 3:
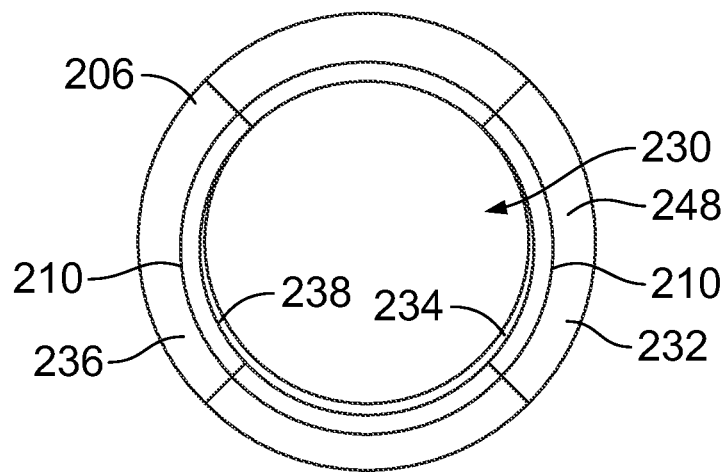
FIG. 3 is a front view of an inlet cowl of the nacelle shown in FIG. 2.
Figure 4:
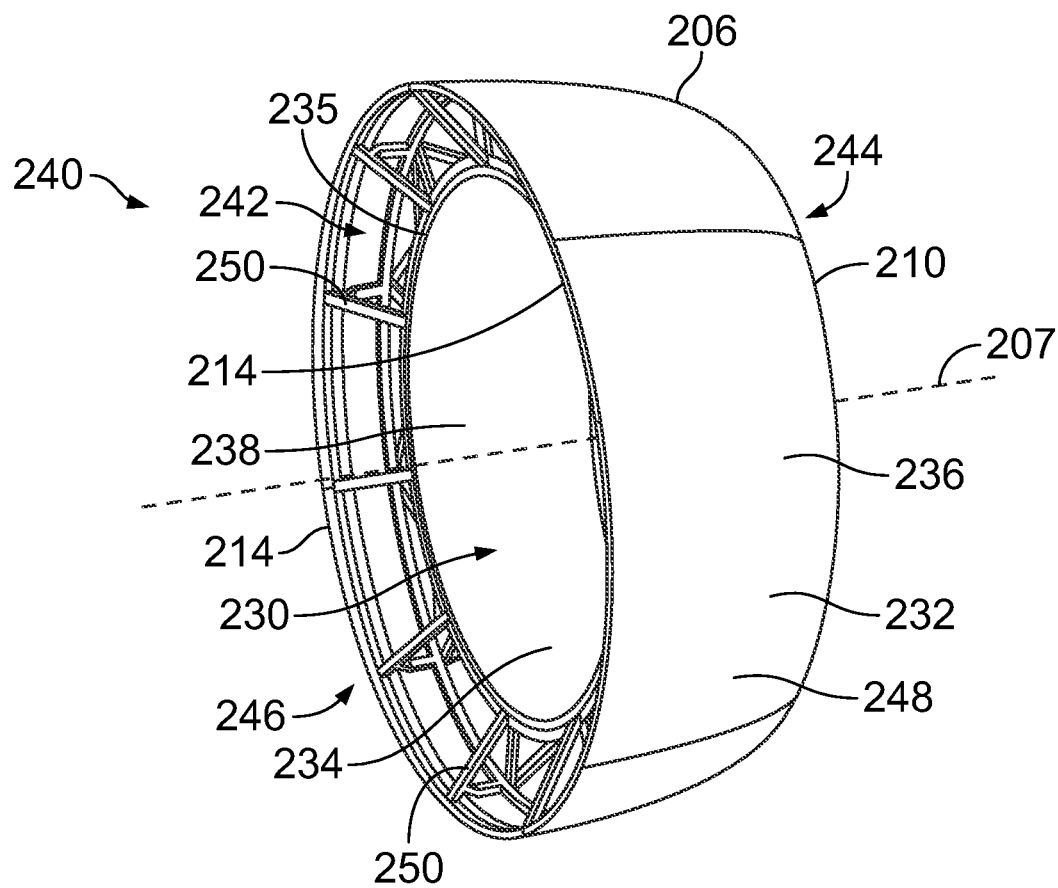
FIG. 4 is a perspective view of the inlet cowl shown in FIGS. 2 and 3, showing an aft edge thereof.

FIG. 3 is a front view of the inlet cowl 206 shown in FIG. 2. FIG. 4 is a perspective view of the inlet cowl 206 shown in FIGS. 2 and 3, showing the outer aft edge 214 of the inlet cowl 206. The inlet cowl 206 has an annular barrel shape that defines a central opening 230. The term "annular barrel shape" means that the inlet cowl 206 defines a closed, ring-like shape when viewed from the front. The annular barrel shape is oriented about a central longitudinal axis 207.

The central longitudinal axis 207 extends through the central opening 230. The inlet cowl 206 may have a generally cylindrical shape. For example, the leading edge 210 may be circular. The inlet cowl 206 directs air through the central opening 230 into the core 212 of the nacelle 200 shown in FIG. 2.

The inlet cowl 206 has the leading edge 210, an outer side 232 and an inner side 234. The outer side 232 extends from the leading edge 210 to the outer aft edge 214. The inner side 234 extends from the leading edge 210 to an inner aft edge 235 of the inner side 234. The outer side 232 is radially outside of the inner side 234 and surrounds the inner side 234. The outer side 232 and inner side 234 optionally may be referred to as an outer barrel portion and an inner barrel portion, respectively. The inner side 234 may define the central opening 230, and operates as an intake duct to supply air into the core 212 for the rotor assembly 119. The inlet cowl 206 defines a cavity 242 that is aft of the leading edge 210 and radially disposed between the outer side 232 and the inner side 234. The cavity 242 is closed at a front end 244 of the inlet cowl 206, and open at a rear or aft end 246 of the inlet cowl 206.

The inlet cowl 206 may include a lipskin 236 and an acoustic panel 238. In an embodiment, the lipskin 236 defines the leading edge 210 and the outer side 232. The acoustic panel 238 is coupled to the lipskin 236 along the inner side 234, and the acoustic panel 238 defines a length of the inner side 234. For example, the lipskin 236 may define a front portion of the inner side 234, and the acoustic panel 238 may define a rear or aft portion of the inner side 234. The acoustic panel 238 is located forward of the fan cowl 208. The acoustic panel 238 may be located in relatively close proximity to one or more fans or other rotary equipment. The acoustic panel 238 may have a plurality of acoustic perforations for absorbing noise generated by the rotor assembly and/or the airflow passing through the inlet cowl 206.

FIG. 4 shows an inlet assembly 240 that includes the inlet cowl 206 and one or more support frames 250. The inlet assembly 240 includes multiple support frames 250 in the illustrated embodiment. The support frames 250 are disposed within the cavity 242 of the inlet cowl 206 to mechanically support the contour of the inlet cowl 206. For example, the support frames 250 extend across the cavity 242 from the inner side 234 to the outer side 232 to provide structural rigidity to the inlet cowl 206 (e.g., the lipskin 236 and the acoustic panel 238). The support frames 250 may help withstand pressure and other forces exerted on the exterior surface 248 without deflecting and changing the contour of the outer side 232. For example, deflection of the outer side 232 changes the contour, which may disrupt the laminar fluid flow along the exterior surface 248. One or more of the support frames 250 may be open truss-like structures that enable air flow through openings in the support frames 250 (within the cavity 242). In an embodiment, the inlet assembly 240 may lack bulkheads that partition the cavity 242 into multiple channels or regions that are blocked off from each other (e.g., fluidly isolated from each other). Avoiding bulkheads which sub-divide the cavity 242 may reduce the complexity of manufacturing the inlet assembly 240 relative to conventional inlets.

The inlet assembly 240 may also include one or more components of a fluid ice protection system (FIPS) 262 (shown in FIG. 6) integrated into the cavity 242 of the inlet cowl 206. The FIPS 262 supplies an anti-ice liquid onto the exterior surface 248 of the inlet cowl 206 to prohibit ice formation on the exterior surface 248. The exterior surface 248 that receives the anti-ice liquid is a leading edge section 258 (shown in FIG. 5) of the inlet cowl 206 that encompasses the leading edge 210. The exterior surface 248 is exposed to the elements, such as sunlight, moisture, debris, wind, birds, etc.

Figure 5:
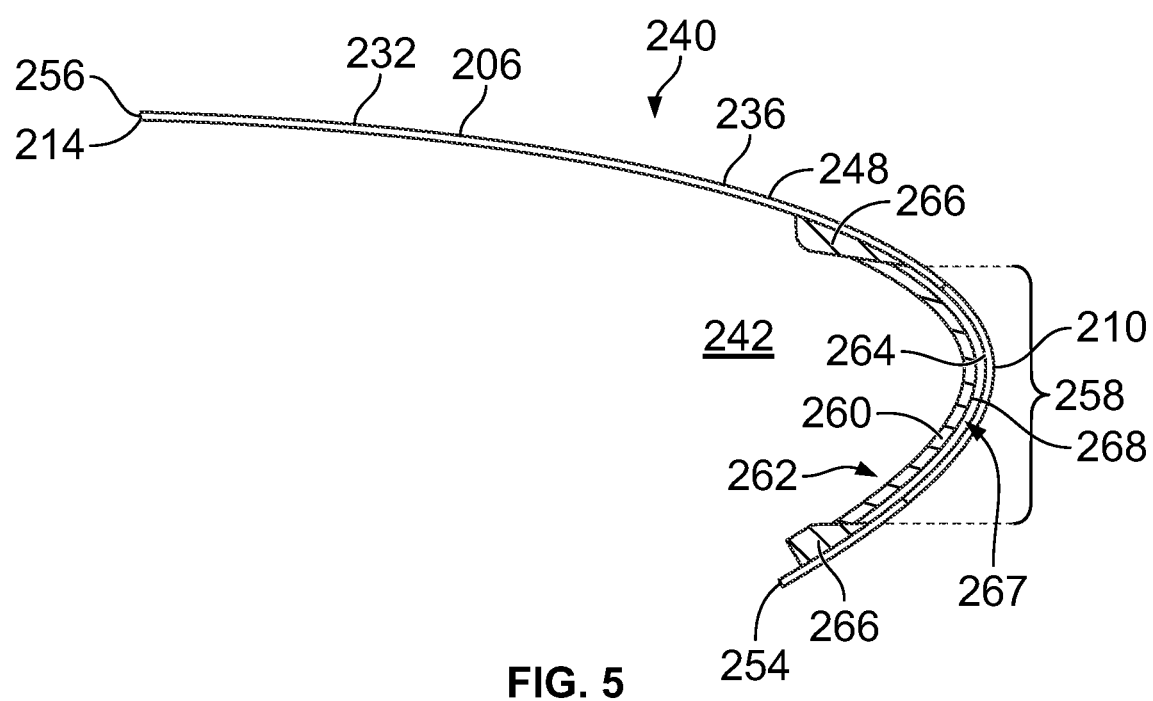
FIG. 5 is a cross-sectional view of a portion of an inlet assembly according to an embodiment.

FIG. 5 is a cross-sectional view of a portion of the inlet assembly 240 according to an embodiment. The illustrated portion shows the lipskin 236 of the inlet cowl 206 without the acoustic panel 238. For example, the acoustic panel 238 may couple to an inner edge 254 of the lipskin 236 during the assembly process. The lipskin 236 in the illustrated embodiment has a curved shape that radially and longitudinally extends forward from the inner edge 254 to the leading edge 210, and then rearward to an outer, aft edge 256 of the lipskin 236. The lipskin 236 may be relatively thin. The area of the inlet cowl 206 (e.g., the lipskin 236 thereof) that includes the leading edge 210 and the areas radially adjacent the leading edge 210 is referred to herein as a front or leading edge section 258 of the lipskin 236. The outer, aft edge 256 may define the aft edge 214 of the inlet cowl 206, such that the lipskin 236 extends the full length of the inlet cowl 206 along the outer side 232.

In an embodiment, the exterior surface 248 of the inlet cowl 206 is smooth and defined by a single, continuous construct along the entire length of the outer side 232. For example, a metallic coating 272 (shown in FIG. 6) of the lipskin 236 may define the exterior surface 248 along the entire length of the outer side 232 from the leading edge 210 to the outer aft edge 214 of the inlet cowl 206. There are no seams, joints, or interfaces along the outer side 232, which promotes laminar air flow along the aerodynamic exterior surface 248 by avoiding turbulence-inducing interfaces. The inlet assembly 240 may provide a longer and/or larger surface area along which the air flow is laminar, than conventional inlets, as described in more detail with reference to FIGS. 9 and 12. The enlarged laminar flow region may provide a substantial drag benefit and fuel efficiency gain over conventional inlets.

The components of the FIPS 262 integrated into the inlet assembly 240 may include a plenum back wall 260 that is affixed to the inlet cowl 206. The plenum back wall 260 is disposed within the cavity 242 of the inlet cowl 206 and extends along the leading edge section 258 of the inlet cowl 236. The plenum back wall 260 may be affixed to an interior surface 264 of the inlet cowl 206. In an embodiment, the plenum back wall 260 is bonded to the interior surface 264. In an embodiment, the lipskin 236 of the inlet cowl 206 includes two (e.g., first and second) integrated protrusions 266 along the interior surface 264 that serve as mounts on which to affix the plenum back wall 260. The protrusions 266 project from the interior surface 264 into the cavity 242. The protrusions 266 may be integral to the lipskin 236. In an alternative embodiment, the protrusions 266 may be discrete components that are themselves mounted to the interior surface 264 and serve to indirectly secure the plenum back wall 260 to the lipskin 236. The plenum back wall 260 is mounted to the inlet cowl 206 to define a plenum 267 (e.g., fluid manifold) for receiving and containing the anti-ice liquid of the FIPS 262. The plenum 267 is longitudinally defined between the interior surface 264 of the lipskin 236 and a front surface 268 of the back wall 260. The plenum 267 is radially defined between the two protrusions 266. The plenum 267 may be located along the leading edge section 258 of the lipskin 236 only. For example, the plenum 267 may not extend along the outer side 232.

Figure 6:
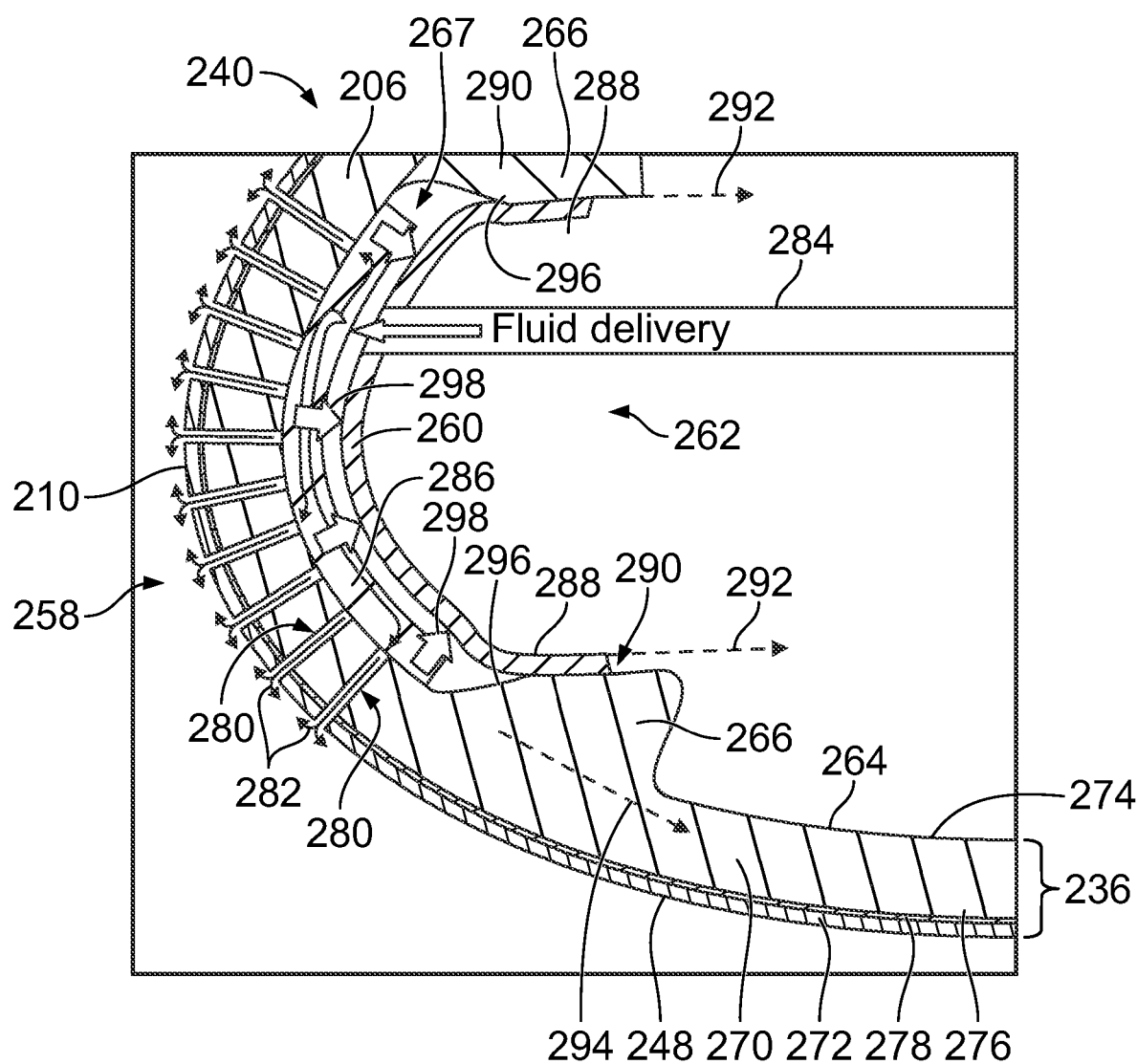
FIG. 6 illustrates an enlarged, schematic rendering of the inlet assembly at a leading edge according to an embodiment.

FIG. 6 illustrates an enlarged, schematic rendering of the inlet assembly 240 at the leading edge 210 according to an embodiment. The illustrated components in FIG. 6 are depicted for ease of description, and may not be drawn to scale. The lipskin 236 of the inlet cowl 206 in an embodiment is a stack-up of multiple different layers. The lipskin 236 may include at least a composite panel 270 and a metallic coating 272. The metallic coating 272 is exterior of the composite panel 270 to provide an erosion shield that protects the composite panel 270 from leading edge damage. The metallic coating 272 may define the exterior surface 248 of the inlet cowl 206 along at least the leading edge section 258, and optionally all of the surface area of the inlet cowl 206 that is exposed to the environmental elements. The composite panel 270 and metallic coating 272 may continuously extend the full length of the lipskin 236.

The composite panel 270 has an interior composite surface 274 and an exterior composite surface 276, which is opposite the interior composite surface 274. The interior composite surface 274 may define the interior surface 264 of the inlet cowl 206. The metallic coating 272 is disposed along the exterior composite surface 276 of the composite panel 270. In an embodiment, the metallic coating 272 is indirectly bonded to the exterior composite surface 276 via one or more intervening layers. The one or more intervening layers may include an electrically conductive interface film 278 that is provided to assist with the application of the metallic coating 272 on the composite panel 270. For example, the interface film 278 may enable electroplating of the metallic coating 272 on the composite panel 270, as described herein with reference to FIGS. 10 and 13. The interface film 278 may be a metallic material that has a different composition than the metallic coating 272. For example, the interface film 278 may be a doped adhesive ply that includes metallic particulate. The metallic particular in an embodiment is silver (Ag), such that the interface film 278 is silver-loaded. The interface film 278 may have an interior interface surface that is applied to the exterior composite surface 276 of the composite panel 270. The interior interface surface may include an adhesive that bonds to the exterior composite surface 276. The metallic coating 272 may be electroplated to form in-situ on an exterior interface surface of the interface film 278 that is opposite the interior interface surface. In an embodiment, the film 278 may be Ag-doped. Instead of, or in addition to, the silver, the film 278 may include other doping materials such as aluminum (Al), antimony (Sb), and/or the like.

In an embodiment, the composite panel 270 is or includes carbon fiber. For example, the composite panel 270 may have a carbon fiber reinforced polymer (CFRP) material. The polymer may be a plastic (e.g., thermoplastic) or the like. The metallic coating 272 may be a metal alloy. For example, the metallic coating 272 in an embodiment is a nickel-containing alloy such as nickel-cobalt (NiCo) alloy. The metallic coating 272 may be deposited onto the lipskin 236 to solidify and harden. In an embodiment, the metallic coating 272 is applied via electroplating. For example, the metallic coating 272 may be a NiCo alloy that is electroplated directly onto the outer surface of the conductive interface film 278 of the lipskin 236.

The lipskin 236 of the inlet cowl 206 may define multiple perforations 280 that penetrate the thickness of the lipskin 236 along the leading edge section 258. The perforations 280 may extend continuously through the composite panel 270, the conductive interface film 278, and the metallic coating 272. The perforations 280 are aligned with and open to the plenum 267, such that the perforations 280 are fluidly connected to the plenum 267 and receive anti-ice liquid 282 from the plenum 267. The characteristics of the perforations 280, such as diameter, location, percent-open-area, etc., may be selected based on application-specific parameters. In an embodiment, the perforations 280 have micron scale diameters. For example, a diameter of each perforation may be less than 100 microns. The microscopic perforations 280 may be formed via laser drilling. The tiny perforations 280 enable to the liquid 282 under pressure to slowly weep through the perforations 280 onto the exterior surface 248. The anti-ice liquid 282 may be a solution that provides freezing point depression. For example, the anti-ice liquid 282 may be a propylene glycol-based solution, an ethylene glycol-based solution, or the like.

The components of the FIPS 262 that are illustrated in FIG. 6 include the plenum back wall 260, a fluid delivery conduit 284 that is coupled to the plenum back wall 260, and one or more membranes 286. The conduit 284 may be a duct, tube, or the like that is a component of a fluid delivery network of the FIPS 262. The fluid delivery network provides a path from a fluid reservoir to the plenum 267. The anti-ice liquid 282 may be pumped through the conduit 284 into the plenum 267 through an aperture in the back wall 260. The one or more membranes 286 are disposed within the plenum 267 (e.g., between the lipskin 236 and the back wall 260) and receive the anti-ice liquid 282. A single membrane 286 is shown in FIG. 6. The membrane 286 may be designed to absorb and distribute the anti-ice liquid 282 to the perforations 280. The membrane 286 may be secured to the interior surface 264 of the inlet cowl 206, such as by bonding. The membrane 286 aligns with the perforations such that the membrane 286 may extend across and cover all or a majority of the perforations 280. The membrane 286 may spread the anti-ice liquid 282 along a length of the membrane 286 which supports a more uniform distribution of the liquid 282 among the perforations 280. The membrane 286 optionally may be a porous material, such as a porous plastic material, an open-celled foam material, or the like.

In an embodiment, the plenum back wall 260 includes first and second flanges 288 at respective ends of the back wall 260. The flanges 288 are secured to the protrusions 266 of the lipskin 236 along respective contact interfaces 290. The flanges 288 may be bonded to the protrusions 266 at the contact interfaces 290. The bonding may be accomplished via application of an adhesive, a heat treatment, and/or the like. In an embodiment, the contact interfaces 290 are angled transverse to the tangent of the interior surface 264 of the lipskin 236 proximate to the contact interfaces 290 to enhance retention of the plenum back wall 260 to the lipskin 236. The contact interfaces 290 extend along ramp surfaces 296 of the protrusions 266. The contact interfaces 290 have vectors 292 that are not parallel to the tangent 294 of the interior surface 262. The contact interfaces 290 are angled to shift the pressure loading dynamics along the bonded interfaces 290 and enable the plenum back wall 260 to withstand more force before separating from the lipskin 236, relative to bonding the back wall 260 to a flat or non-projecting area of the interior surface 264 of the lipskin 236.

For example, the plenum 267 may experience pressure that tends to force the plenum back wall 260 away from the leading edge 210, as indicated by the force arrows 298. Furthermore, the composite panel 270 and the protrusions 266 are not metallic, so the plenum back wall 260 cannot be welded to the lipskin 236. In an embodiment, the protrusions 266 may be composed of a rigid, closed-cell foam. By bonding the flanges 288 to the protrusions 266 along the angled contact interfaces 290, the forces exerted on the back wall 260 are withstood by shear retention along the contact interfaces 290. For example, the forces on the back wall 260 may be acutely angled relative to the interface vectors 292, which is resisted in part by shear loading at the interfaces 290. Without the angled contact interfaces 290, the forces on the back wall 260 may peel the back wall 260 off the interior surface 264 of the lipskin 236, obstructing, if not entirely foiling, operation of the FIPS 262.

Figure 7:
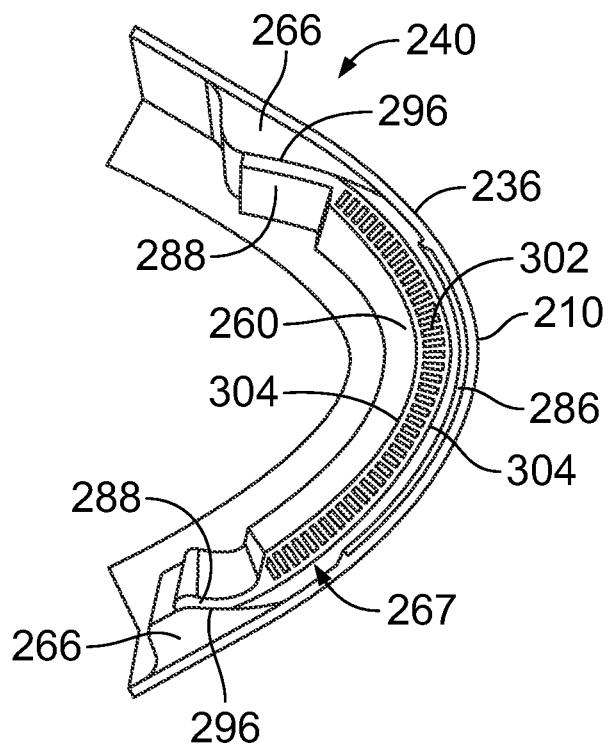
FIG. 7 is a cross-sectional view of a nose portion of the inlet assembly according to an embodiment.
Figure 8:
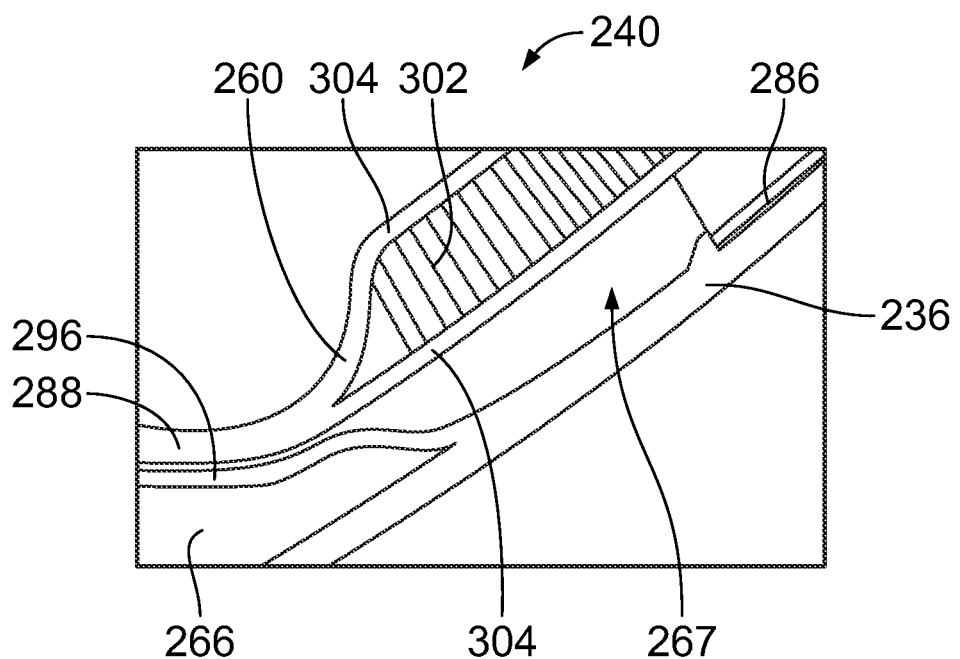
FIG. 8 is an enlarged view of a segment of the nose portion shown in FIG. 7.

FIG. 7 is a cross-sectional view of a nose portion of the inlet assembly 240 according to an embodiment. FIG. 8 is an enlarged view of a segment of the nose portion shown in FIG. 7. The views in FIGS. 7 and 8 may be more accurate in terms of scale and shapes of the components relative to the illustration in FIG. 6. FIG. 7 shows the leading edge 210 of the lipskin 236, the plenum back wall 260, the protrusions 266, and the membrane 286. With reference to both FIGS. 7 and 8, the thin membrane 286 is disposed within the plenum 267. The flanges 288 of the back wall 260 are secured to the ramp surfaces 296 of the protrusions 266, as described with reference to FIG. 6. In an embodiment, the plenum back wall 260 may be a composite structure. For example, the back wall 260 may include a core layer 302 sandwiched between two outer layers 304. The core layer 302 may be a honeycomb structure. In an embodiment, the protrusions 266 may include a rigid, closed-cell foam material. The protrusions 266 may be integrated onto the lipskin 236, such as formed as portions of the CFRP composite panel 270.

Figure 9:
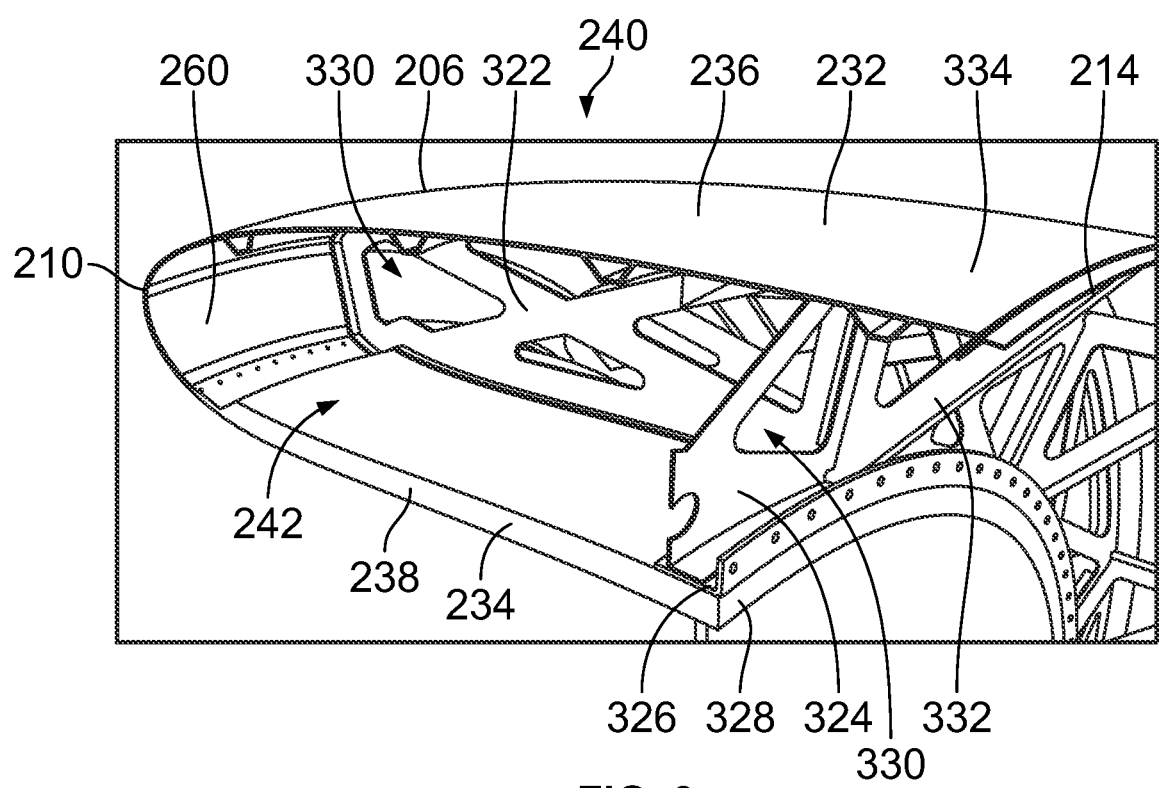
FIG. 9 is a perspective cross-sectional view of a portion of the inlet assembly according to an embodiment.

FIG. 9 is a perspective cross-sectional view of a portion of the inlet assembly 240 according to an embodiment. The acoustic panel 238 longitudinally extends along the inner side 234, and the lipskin 236 longitudinally extends the length of the outer side 232. The plenum back wall 260 is disposed at the front end of the cavity 242, interior of the leading edge 210. The inlet assembly 240 may include support frames 250 within the cavity 242 to mechanically support the extended length of the lipskin 236 and withstand forces exerted on the lipskin 236 to maintain the shape of the inlet cowl 206.

In an embodiment, the support frames 250 include longitudinally-extending support frames 322 that are circumferentially spaced apart. The support frames 250 may also include circumferentially-extending support frames 324. The circumferentially-extending support frames 324 may be located proximate to the outer aft edge 214 of the inlet cowl 206. For example, the support frames 324 may be coupled to a flange 326 mounted to an aft edge 328 of the acoustic panel 238, which defines the inner aft edge 235 of the inlet cowl 206. The support frames 324 may be perpendicular to the support frames 322. The support frames 322, 324 may all radially extend across the cavity 242 from the outer side 232 to the inner side 234, and may be coupled to both the outer and inner sides 232, 234. In an embodiment, the support frames 322, 324 are open, truss-like structures that permit fluid flow through openings 330 in the frames 322, 324. The support frames 322, 324 may be rearward or aft of the plenum back wall 260.

In an embodiment, the outer side 232 extends rearward beyond the inner aft edge 235 of the inner side 234. The portion of the outer side 232 that extends beyond the inner aft edge 235 is an extended section 334 of the outer side 232. The extended section 334 may overhang relative to the acoustic panel 238. The inlet assembly 240 may include one or more angled support frames 332 to support the overhanging, extended section 334 of the outer side 232.

Figure 12:
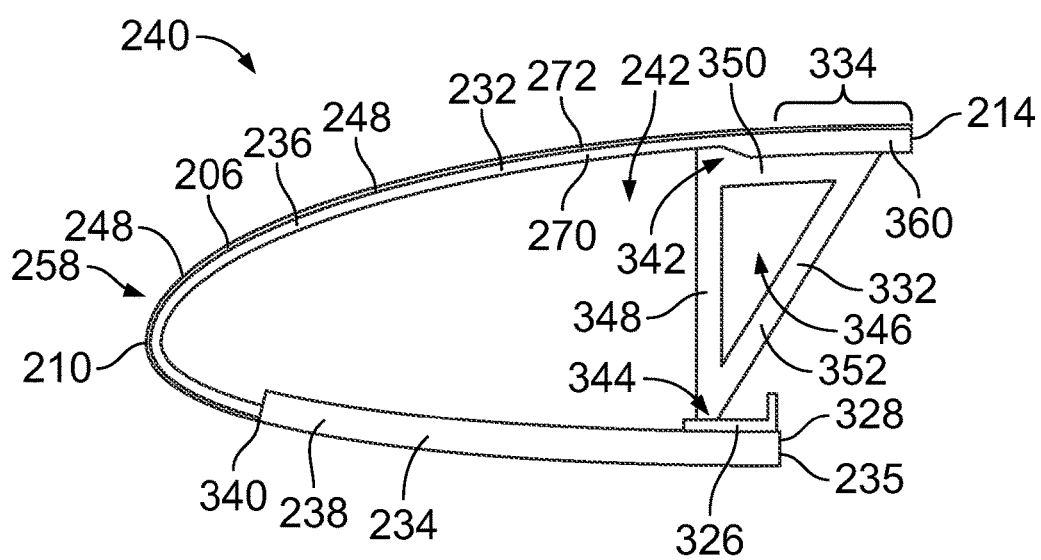
FIG. 12 is a side cross-sectional view of a portion of the inlet assembly according to an embodiment.

FIG. 12 is a side cross-sectional view of a portion of the inlet assembly 240 according to an embodiment. The inlet assembly 240 may be the same as the inlet assembly 240 shown in FIG. 9, except that the plenum back wall 260 and the longitudinally-extending and circumferentially-extending support frames 322, 324 are omitted from FIG. 12. In an embodiment, the exterior surface 248 of the inlet cowl 206 is seamless along an entire length of the outer side 232 from the leading edge 210 to the outer aft edge 214.

The lipskin 236 may define both the leading edge section 258 (including the leading edge 210) and the outer side 232. For example, both the composite panel 270 and the metallic coating 272 of the lipskin 236 extend the entire length of the outer side 232 from the leading edge 210 to the outer aft edge 214. The metallic coating 272 may define the exterior surface 248 of the inlet cowl 206 along an entirety of both the leading edge section 258 and the outer side 232. The metallic coating 272 provides an erosion shield for the composite panel 270, and also provides a relatively smooth, uniform surface that promotes laminar flow. Because the metallic coating 272 continuously extends from the leading edge 210 to the outer aft edge 214, the outer side 232 is free of seams, joints, and other types of material interfaces. The lipskin 236 couples to the acoustic panel 238 at a joint 340. The joint 340 is disposed along the inner side 234 of the inlet cowl 205. The flow characteristics of air along the inner side 234 may not have as significant of an effect on flight performance and fuel efficiency as the flow characteristics along the outer side 232. As shown in FIG. 12, the acoustic panel 238 may be substantially thicker than a thickness of the lipskin 236.

In an embodiment, the inlet cowl 206 is designed to achieve a relatively long laminar flow region along the exterior surface 248 of the outer side 232. The laminar flow region is an area along which the moving air flow (during flight of the aircraft) is characterized by laminar flow, rather than turbulent flow. For example, a contour of the outer surface 232 may be designed to promote laminar flow. The contour may be designed based on laminar flow theory. Furthermore, the exterior surface 248 of the outer side 232 is defined by a smooth metallic coating 272 and is devoid of seams and other discontinuities. The laminar flow region may extend along the contour of the outer side 232 for the entire length of the outer side 232 (e.g., from the leading edge 210 to the outer aft edge 214).

FIG. 12 shows the extended section 334 of the outer side 232 of the inlet cowl 206 that longitudinally projects beyond the inner aft edge 235 of the inner side 234. The extended section 334 extends to, and includes, the outer aft edge 214. The extended section 334 may be a seamless extension of the contour of the outer side 232. For example, the lipskin 236 may define the extended section 334, and the metallic coating 272 may define the exterior surface 248 of the inlet cowl 206 along the extended section 334. The laminar flow region may extend along the contour of the outer side 232 onto the extended section 334. By providing the extended section 334, the length of the laminar flow region may be elongated relative to not including the extending section 334. For example, the laminar flow region may longitudinally extend beyond a location at which the inner side 234 of the inlet cowl 206 interfaces with the fan cowl 208. The location at which the inner side 234 interfaces with the fan cowl 208 may be the flange 326 (e.g., the A flange), a fan cowl split line, and/or the like.

In an embodiment, the extended section 334 may be structurally supported by one or more angled support frames 332 within the cavity 242. For example, the angled support frame 332 may be assembled to maintain the contour of the outer side 232 along the extended section 334. The angled support frame 332 may prohibit the extended section 334 from deflecting from applied forces during operation, which could disrupt the laminar flow along the extended section 334. The angled support frame 332 has a first end 342 that contacts the extended section 334 and a second end 344 that contacts the inner side 234. For example, the second end 344 may be coupled to the flange 326 and/or to the acoustic panel 238. In an embodiment, the angled support frame 332 is triangular and defines one or more openings 346 through the support frame 332. For example, the angled support frame 332 includes a first leg 348 that radially extends across the cavity from the first end 342 to the second end 344. The support frame 332 includes a second leg 350 that longitudinally extends along a length of the extended section 334 and engages the extended section 334. The support frame 332 includes a third, angled leg 352 that extends across the cavity 342 from the inner side 234 to the extended section 334 and defines a hypotenuse of the triangular shape. In an alternative embodiment, the angled support frame 332 may not be triangular. For example, the support frame 332 may only include the first and second legs 348, 350 (not the third leg 352), or may only include the third leg 352 (not the first and second legs 348, 350). In another alternative embodiment, the angled support frame 332 may be an integral portion of the longitudinally-extended support frame 322 shown in FIG. 9, rather than a discrete component.

In an alternative embodiment, the extended section 334 may be inherently structurally supported by the composite panel 270 of the lipskin 236, instead of by the angled support frame(s) 332. For example, the composite panel 270 may include CFRP material that extends along the full length of the extended section 334 and has sufficient strength to structurally maintain the contour of the outer side 232, without discrete support frames. Optionally, the lipskin 236 may be formed such that additional plies of CFRP material are stacked along the extended section 334. As a result, the composite panel 270 may be thicker along the extended section 334 than along other portions of the lipskin 236, such as the leading edge section 258. FIG. 12 shows a thicker section 360 of the composite panel 270 along the extended section 334. Although FIG. 12 shows both the angled support frame 332 and the thicker section 360 of the composite panel 270, these features may be alternatives. For example, the angled support frame 332 may be installed without thickening the CFRP composite panel 270, or the CFRP composite panel 270 may be thickened to avoid installation of the angled support frame 332.

Figure 10:
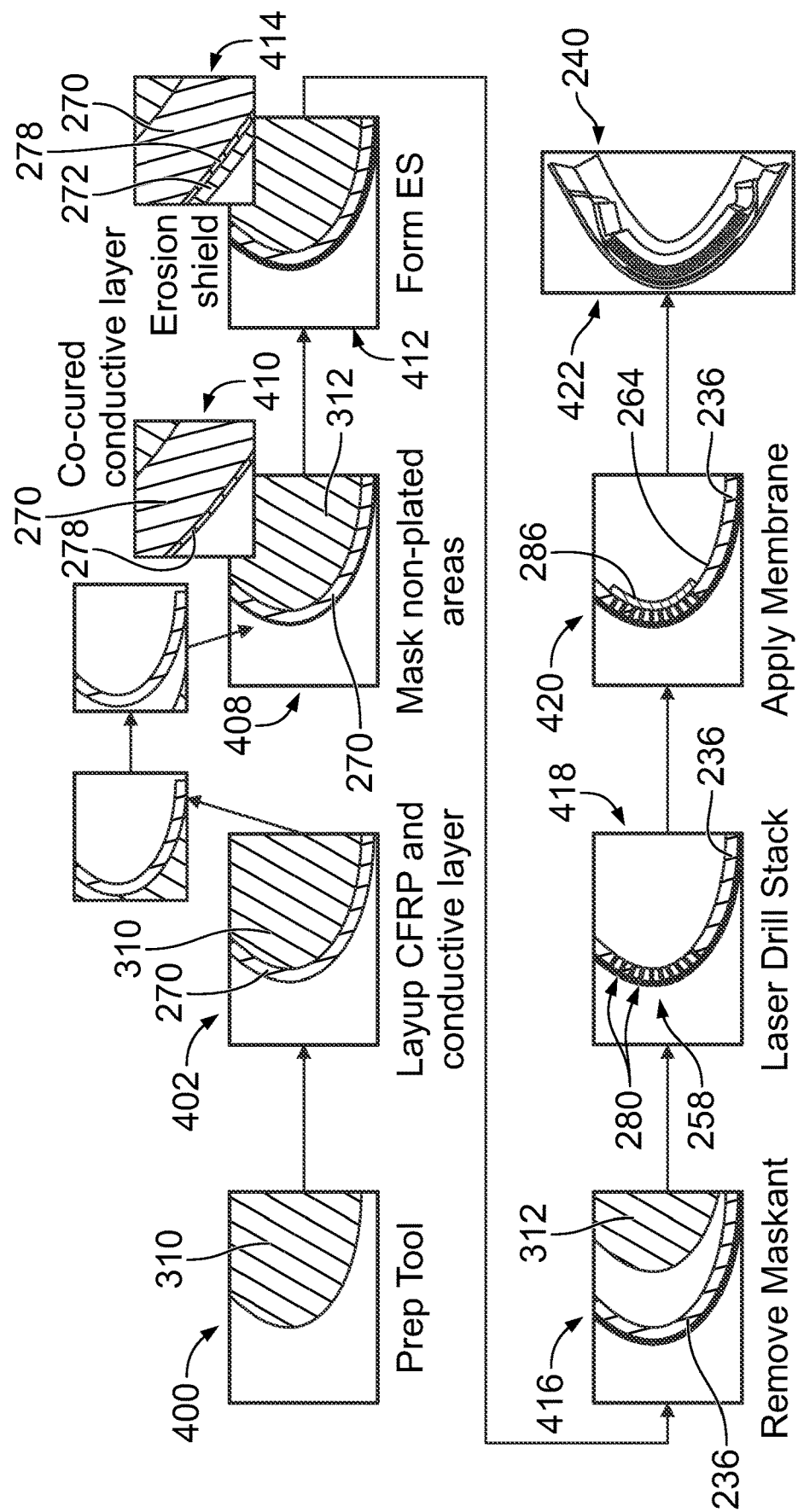
FIG. 10 is a schematic diagram depicting a process of assembling an inlet assembly according to an embodiment.

FIG. 10 is a schematic diagram depicting a process of producing an inlet assembly according to an embodiment. The inlet assembly manufactured by the process may be the inlet assembly 240 shown in FIGS. 4 through 9 and FIG. 12. At box 400, a curved tool 310 is prepped for a layup process. The curved tool 310 may be a mold or mandrel. The tool 310 may have a shape that corresponds to a desired shape of the inlet cowl. At box 402, a carbon fiber reinforced polymer (CFRP) material is applied on the curved tool 310 to form the composite panel 270 via a layup process. The layup process may be an automated fiber placement (AFP) process in which multiple plies or layers of fiber-reinforced material are applied on the tool 310. The plies may include tows or bundles of carbon fibers impregnated with an epoxy resin. The tows may be applied in different orientations relative to one another. Although not shown, the protrusions 266 of the lipskin 236 may be formed during the layup step shown in box 402.

The composite panel 270 may then be cured via a heat treatment and removed from the tool 310. The conductive interface film 278 may be applied to the exterior composite surface 276 of the composite panel 270. At box 408, non-plated areas of the composite panel 270 are masked by a maskant 312. The conductive interface film 278 may be co-cured at box 410.

At box 412, the metallic coating 272 is applied on the composite panel 270 (and conductive interface film 278) by electroplating. The metallic coating 272 is shown in the inset enlarged view in box 414. The metallic coating 272 may be a nickel alloy, such as NiCo. At box 416, the maskant is removed from the structure, yielding the lipskin 236 (or stack). At box 418, the lipskin 236 is laser drilled to form perforations 280 through the thickness thereof in the leading edge section 258. At box 420, the membrane 286 is applied along the interior surface 264 of the inlet cowl 206 (e.g., the lipskin 236) to cover the perforations 280.

Box 422 shows a portion of the completed inlet assembly 240, similar to the view in FIG. 7. The assembly process may include additional steps not depicted in FIG. 10, such as bonding the plenum back wall 260 to the composite panel 270 and connecting the fluid delivery conduit 284 to the plenum back wall 260. Additional portions of the FIPS 262 may need to be assembled before the FIPS 262 is operational.

Figure 13:
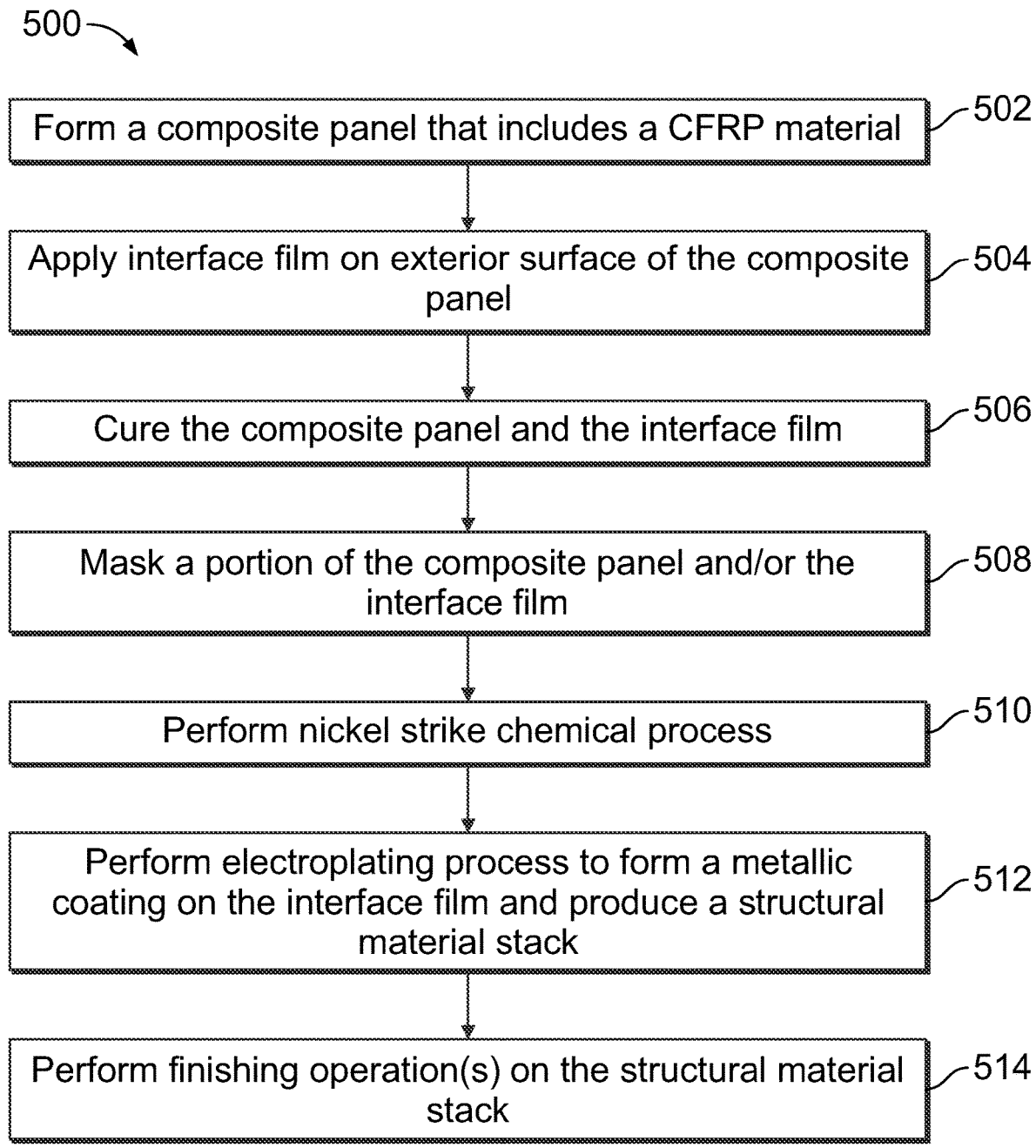
FIG. 13 is a flow chart of a method for producing a structural material stack for an aircraft according to an embodiment.
Figure 14:
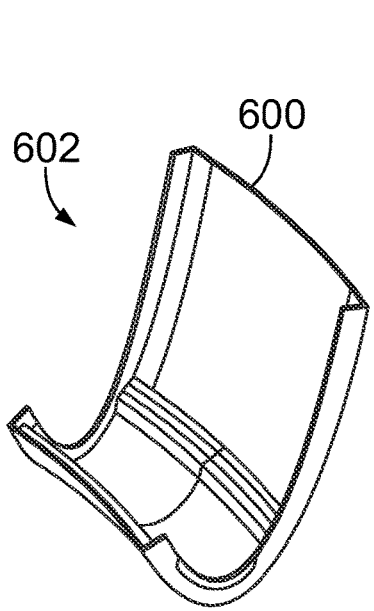
FIG. 14 illustrates a structural material stack in the shape of a formed part according to an embodiment.
Figure 15:
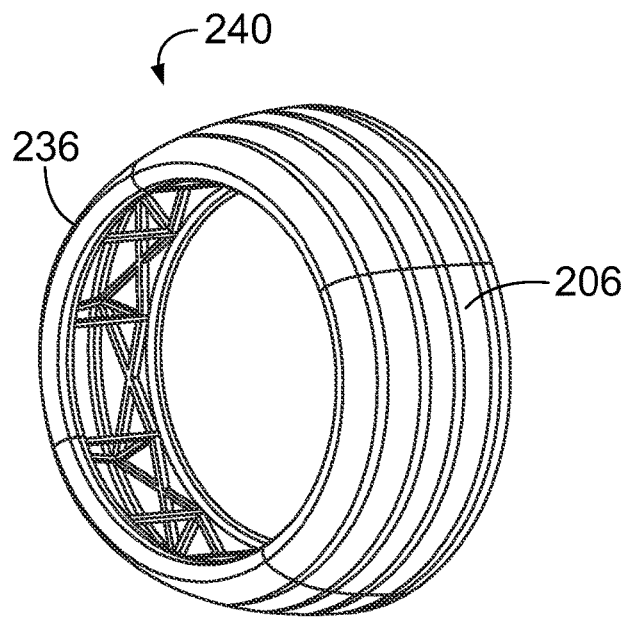
FIG. 15 is a perspective view of the inlet assembly.

FIG. 13 is a flow chart 500 of a method for producing a structural material stack for an aircraft according to an embodiment. The structural material stack may be the lipskin 236 of the nacelle inlet cowl 206 described herein. For example, FIG. 14 illustrates a structural material stack 600 in the shape of a formed part 602. The structural material stack 600 may be produced via the method. The structural material stack 600 may include the composite panel 270, the interface film 278, and the metallic coating 272 shown in FIG. 6. FIG. 15 is a perspective view of the inlet assembly 240. The formed part 602 in the illustrated example is a section of the lipskin 236 of the inlet assembly 240. For example, multiple copies or replicas of the formed part 602 may be coupled together to define the annular barrel shape of the inlet cowl 206 shown in FIG. 15. The parts 602 may each define a different circumferential section of the inlet cowl 206. Alternatively, the structural material stack produced via the method may be used for other aircraft components and/or non-aircraft applications. The method enables reliably and accurately electroplating a metallic coating on a CFRP panel to form the structural material stack. The method may include additional steps, fewer steps, and/or different steps than the steps illustrated in the flow chart 500.

Returning to the FIG. 13 discussion, at step 502, a composite panel 270 is formed that includes a carbon fiber reinforced polymer (CFRP) material. The composite panel 270 may be formed to have a curved contour that represents at least a portion of an annular barrel shape. For example, the panel 270 may be formed in the shape of the part 602 shown in FIG. 14, which represents a sub-section of the annular barrel shape shown in FIG. 15. The CFRP material may be formed via a layup process on a mandrel or other tool as described with reference to box 402 of FIG. 10.

At step 504, a conductive interface film 278 is applied on an exterior composite surface 276 of the composite panel 270. The conductive interface film 278 may be a doped adhesive ply including metallic particulate. The metallically-doped interface film 278 may include relatively high metallic content, such as over 50% by weight. In an embodiment, the interface film 278 may have about 80% metallic particulate. The metallic particulate may be silver, such that the interface film 278 is a silver-loaded film. The interface film 278 may be adhesively bonded to the exterior composite surface 276 of the CFRP composite panel 270.

In an embodiment, the interface film 278 may be relatively brittle due to the high metallic content. To compensate, a carrier sheet may be used to support draping the interface film 278 on the contoured exterior composite surface 276 of the composite panel 270. For example, a first side of the interface film 278 may have an adhesive on an interior interface surface of the interface film 278. The carrier sheet may be applied on an exterior interface surface of a second side of the interface film 278. The interior interface film with the adhesive may be opposite the exterior interface film. The adhesive may be protected (e.g., covered) prior to the application via a backing sheet. Optionally, the interface film 278 may be applied by removing the backing sheet to exposed the adhesive along the interior interface surface. Then the carrier sheet is used to drape the interface film 278 on the exterior composite surface 276 of the panel 270. Local heating may be applied to the carrier sheet to warm the film 278 and allow the film 278 to lay flat and follow the contours of the composite panel 270. Once the interface film 278 is in place, the carrier sheet may be removed while the interface film 278 remains in place on the composite panel 270. The exterior interface surface of the interface film 278 is exposed for the subsequent plating step(s).

At step 506, the composite panel 270 and interface film 278 are cured. The interface film 278 may be co-cured with the composite panel 270 to assure adequate adhesion. The curing may ensure uniform electrical conductivity across the exposed surface of the interface film 278. The high metal content may provide the uniform conductivity property. The uniform electrical conductivity across the surface of the film 278 may enable the subsequent metal plating to achieve uniform plating thickness and a requisite surface quality.

After applying the interface film 278 on the CFRP composite panel 270, the part is prepared for plating. At step 508, at least a portion of the exposed surface area of the composite panel 270 and/or interface film 278 is masked. For example, a maskant (e.g., a tape, spray-on removable film, or the like) may be applied along an interior surface 264 of the composite panel 270 and/or edge sections of the interface film 278 along a perimeter of the interface film 278. The interior surface 264 is not covered by the interface film 278, as shown in FIG. 6. At step 510, a nickel strike chemical process is performed. The nickel strike process prepares the interface film 278 for subsequent metallic plating of the metallic coating 272. The nickel strike process may remove oxidation material from the exposed exterior interface surface of the metallically-loaded interface film 278. The nickel strike process may involve dipping the masked part into a nickel strike tank that is filled with an acidic chemical.

Figure 16:
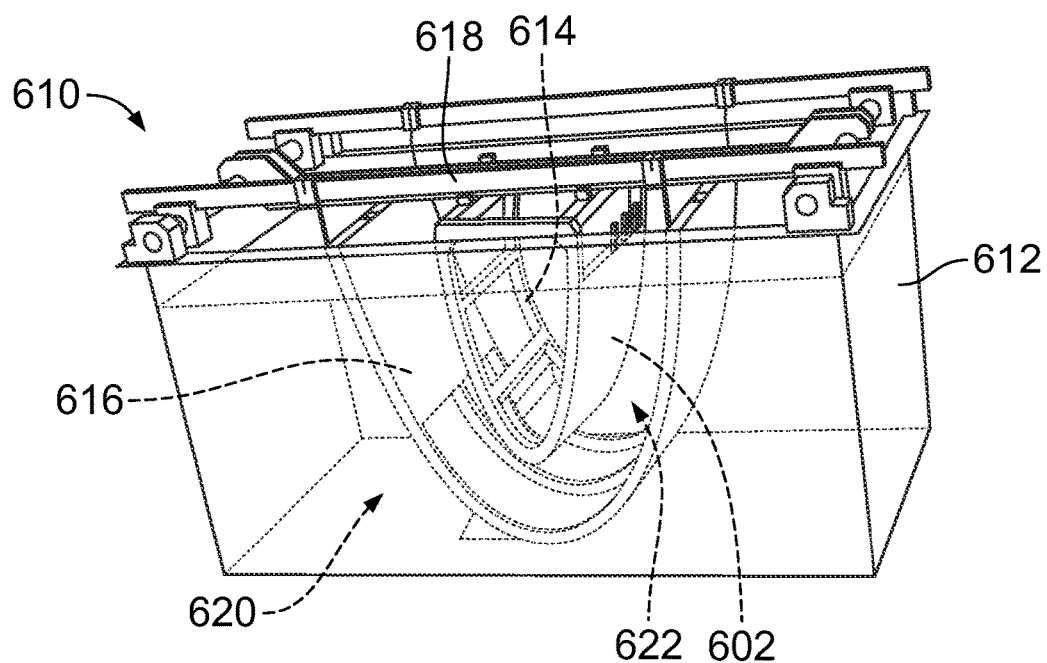
FIG. 16 illustrates the formed part of FIG. 14 disposed in a plating system during an electroplating process according to an embodiment.

At step 512, an electroplating process is performed to form a metallic coating 272 on the interface film 278. FIG. 16 illustrates the part 602 disposed in a plating system 610 during the electroplating process according to an embodiment. The plating system 610 includes a tank 612, a fixture 614, a basket 616, and a rack 618 for holding and suspending the fixture 614 and the basket 616 into the tank 612. The tank 612 contains a plating solution 620. The basket 616 is disposed within the plating solution 620 and holds metal pellets. In an embodiment, the pellets include nickel pellets, and the solution 620 is sulfamate. The pellets may dissolve in the solution 620. The part 602 is held by the fixture 614 within the solution 620. The fixture 614 suspends the part 602 within a cavity 622 defined by the basket 616. When disposed within the solution 620 as shown in FIG. 16, electrical energy is applied into the solution 620 and a cathode and anode effect causes metallic ions to plate on the exterior interface surface of the interface film 278 (and any other non-masked surfaces of the part 602 within the bath). The metallic coating 272 is formed in-situ on the part 602 within the tank 612.

The plating system 610 may include additional components, such as a rectifier, a heating element to control a temperature of the solution 620, and an agitation control device. The agitation control device may be operated by a controller to mix and agitate the solution 620 within the tank 612. The circulation of the solution 620 may be a factor that affects the uniformity and/or thickness of the metallic coating 272 that is formed. The orientation of the part 602 in the bath may also affect the uniformity and/or thickness of the metallic coating 272. The properties of the electroplating process may be tailored based on application-specific considerations to achieve a desired thickness and bond strength of the metallic coating 272.

In an embodiment, the metallic coating 272 that is electroplated on the interface film 278 includes nickel. For example, the metallic coating 272 may be a NiCo alloy. The alloy may be mostly nickel. For example, the ratio of nickel to cobalt may be about 90:10 by weight.

At step 514, one or more finishing operations are performed on the structural material stack. The finishing operations may include removing the maskants, trimming edges of the part 602, and/or performing surface treatment to remove imperfections along, and/or smooth, the exterior (e.g., aerodynamic) surface of the metallic coating 272.

In an embodiment in which the structural material stack is the lipskin 236 of the inlet assembly 240, a subsequent step may include forming the perforations 280 through the thickness of the lipskin 236, as described with reference to box 418 in FIG. 10. Subsequently, multiple parts 602 may be coupled together to assemble the inlet cowl 206.

Further, the disclosure comprises examples according to the following clauses:

Clause 1. A method for producing a structural material stack, the method comprising:
  forming a composite panel that includes a carbon fiber reinforced polymer (CFRP) material, wherein the composite panel includes an exterior composite surface;
  applying an interface film on the exterior composite surface of the composite panel, wherein the interface film is electrically conductive and has an interior interface surface and an exterior interface surface; and
  performing an electroplating process to form a metallic coating on the exterior interface surface of the interface film such that the interface film is sandwiched between the composite panel and the metallic coating, the metallic coating having a different material composition than the interface film, thereby forming said structural material stack.

Clause 2. The method of Clause 1, wherein the composite panel is formed to have a curved contour that represents at least a portion of an annular barrel shape.

Clause 3. The method of Clause 1 or Clause 2, wherein the interface film is applied to the exterior composite surface of the composite panel via adhesive bonding.

Clause 4. The method of any of Clauses 1-3, wherein the interface film is a ply that includes over 50% by weight of a metallic particulate.

Clause 5. The method of Clause 4, wherein the metallic particulate comprises silver.

Clause 6. The method of any of Clauses 1-5, further comprising curing the composite panel and the interface film after applying the interface film and before performing the electroplating process.

Clause 7. The method of any of Clauses 1-6, further comprising performing a nickel strike chemical process on the interface film after applying the interface film and before performing the electroplating process.

Clause 8. The method of any of Clauses 1-7, wherein the electroplating process is performed such that the metallic coating that is formed comprises a nickel alloy composition.

Clause 9. The method of Clause 8, wherein the nickel alloy composition is a nickel cobalt (NiCo) alloy.

Clause 10. The method of any of Clauses 1-9, wherein the structural material stack is a section of a lipskin of an inlet cowl of an aircraft nacelle, and the metallic coating defines an exterior surface of the inlet cowl along a leading edge of the inlet cowl.

Clause 11. The method of Clause 10, further comprising laser drilling a plurality of perforations through the section of the lipskin, wherein the laser drilling comprises emitting a laser beam that penetrates the CFRP material of the composite panel before penetrating the interface film and the metallic coating.

Clause 12. A structural material stack comprising:
 a composite panel that includes a carbon fiber reinforced polymer (CFRP) material, wherein the composite panel includes an exterior composite surface;
 an interface film bonded via an adhesive to the exterior composite surface of the composite panel, wherein the interface film is electrically conductive and has an interior interface surface and an exterior interface surface; and
 a metallic coating formed on the exterior interface surface of the interface film such that the interface film is sandwiched between the composite panel and the metallic coating, the metallic coating having a different material composition than the interface film.

Clause 13. The structural material stack of Clause 12, wherein the composite panel has a curved contour that represents at least a portion of an annular barrel shape.

Clause 14. The structural material stack of Clause 12 or Clause 13, wherein the interface film is a ply that includes over 50% by weight of a metallic particulate.

Clause 15. The structural material stack of Clause 14, wherein the metallic particulate comprises silver.

Clause 16. The structural material stack of any of Clauses 12-15, wherein the metallic coating comprises a nickel alloy composition.

Clause 17. The structural material stack of Clause 16, wherein the nickel alloy composition is a nickel cobalt (NiCo) alloy.

Clause 18. The structural material stack of any of Clauses 12-17, wherein the structural material stack is a section of a lipskin of an inlet cowl of an aircraft nacelle, and the metallic coating defines an exterior surface of the inlet cowl along a leading edge of the inlet cowl.

Clause 19. The structural material stack of Clause 18, wherein the lipskin includes a plurality of perforations that each continuously extend through the composite panel, the interface film, and the metallic coating.

Clause 20. A method for producing an inlet cowl, the method comprising:
 forming a composite panel that includes a carbon fiber reinforced polymer (CFRP) material, the composite panel including an exterior composite surface and formed to have a curved contour that represents at least a portion of an annular barrel shape;
 applying an interface film on the exterior composite surface of the composite panel, wherein the interface film includes over 50% by weight of a metallic particulate; and
 performing an electroplating process to form a metallic coating on the interface film such that the interface film is sandwiched between the composite panel and the metallic coating, the metallic coating having a nickel alloy composition which is different from a material composition of the interface film, wherein the metallic coating defines an exterior surface of the inlet cowl along a leading edge of the inlet cowl.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for producing a lipskin of an inlet cowl of an aircraft nacelle, the method comprising:
   forming a composite panel that includes a carbon fiber reinforced polymer (CFRP) material, wherein the composite panel includes an exterior composite surface;
   applying an interface film on the exterior composite surface of the composite panel, wherein the interface film is electrically conductive and has an interior interface surface and an exterior interface surface; and
   performing an electroplating process to form a metallic coating on the exterior interface surface of the interface film such that the interface film is sandwiched between the composite panel and the metallic coating, the metallic coating having a different material composition than the interface film, thereby forming said lipskin, wherein the metallic coating defines an exterior surface of the inlet cowl along a leading edge of the inlet cowl.

2. The method of claim 1, wherein the composite panel is formed to have a curved contour that represents at least a portion of an annular barrel shape.

3. The method of claim 1, wherein the interface film is applied to the exterior composite surface of the composite panel via adhesive bonding.

4. The method of claim 1, wherein the interface film is a ply that includes over 50% by weight of a metallic particulate.

5. The method of claim 4, wherein the metallic particulate comprises silver.

6. The method of claim 1, further comprising curing the composite panel and the interface film after applying the interface film and before performing the electroplating process.

7. A method for producing a structural material stack, the method comprising:
   forming a composite panel that includes a carbon fiber reinforced polymer (CFRP) material, wherein the composite panel includes an exterior composite surface;
   applying an interface film on the exterior composite surface of the composite panel, wherein the interface film is electrically conductive and has an interior interface surface and an exterior interface surface;
   performing a nickel strike chemical process on the interface film after applying the interface film; and
   performing an electroplating process to form a metallic coating on the exterior interface surface of the interface film after performing the nickel strike chemical process so the interface film is sandwiched between the composite panel and the metallic coating, the metallic coating having a different material composition than the interface film, thereby forming said structural material stack.

8. The method of claim 1, wherein the electroplating process is performed such that the metallic coating that is formed comprises a nickel alloy composition.

9. The method of claim 8, wherein the nickel alloy composition is a nickel cobalt (NiCo) alloy.

10. The method of claim 1, further comprising laser drilling a plurality of perforations through the section of the lipskin, wherein the laser drilling comprises emitting a laser beam that penetrates the CFRP material of the composite panel before penetrating the interface film and the metallic coating.

11. A lipskin of an inlet cowl of an aircraft nacelle, the lipskin comprising:
   a composite panel that includes a carbon fiber reinforced polymer (CFRP) material, wherein the composite panel includes an exterior composite surface;
   an interface film bonded via an adhesive to the exterior composite surface of the composite panel, wherein the interface film is electrically conductive and has an interior interface surface and an exterior interface surface; and
   a metallic coating formed on the exterior interface surface of the interface film such that the interface film is sandwiched between the composite panel and the metallic coating, the metallic coating having a different material composition than the interface film, wherein the metallic coating defines an exterior surface of the inlet cowl along a leading edge of the inlet cowl.

12. The lipskin of claim 11, wherein the composite panel has a curved contour that represents at least a portion of an annular barrel shape.

13. The lipskin of claim 11, wherein the interface film is a ply that includes over 50% by weight of a metallic particulate.

14. The lipskin of claim 13, wherein the metallic particulate comprises silver.

15. The lipskin of claim 11, wherein the metallic coating comprises a nickel alloy composition.

16. The lipskin of claim 15, wherein the nickel alloy composition is a nickel cobalt (NiCo) alloy.

17. The lipskin of claim 11, wherein the lipskin includes a plurality of perforations that each continuously extend through the composite panel, the interface film, and the metallic coating.

18. A method for producing an inlet cowl, the method comprising:
   forming a composite panel that includes a carbon fiber reinforced polymer (CFRP) material, the composite panel including an exterior composite surface and formed to have a curved contour that represents at least a portion of an annular barrel shape;
   applying an interface film on the exterior composite surface of the composite panel, wherein the interface film includes over 50% by weight of a metallic particulate; and
   performing an electroplating process to form a metallic coating on the interface film such that the interface film is sandwiched between the composite panel and the metallic coating, the metallic coating having a nickel alloy composition which is different from a material composition of the interface film, wherein the metallic coating defines an exterior surface of the inlet cowl along a leading edge of the inlet cowl.

19. The method of claim 18, further comprising performing a nickel strike chemical process on the interface film after applying the interface film and before performing the electroplating process.

20. The method of claim 18, wherein the interface film includes over 50% by weight of silver.

* * * * *